(12) United States Patent
Fisher et al.

(10) Patent No.: US 8,860,266 B2
(45) Date of Patent: Oct. 14, 2014

(54) ALTERNATOR HAVING A HEAT SINK AND METHOD

(75) Inventors: Dennis Fisher, Alexandria, IN (US); Samuel Edrington, Noblesville, IN (US)

(73) Assignee: Remy Technologies, L.L.C., Pendleton, IN (US)

(*) Notice: Subject to any disclaimer, the term of this patent is extended or adjusted under 35 U.S.C. 154(b) by 5 days.

(21) Appl. No.: 13/242,648

(22) Filed: Sep. 23, 2011

(65) Prior Publication Data

US 2013/0076173 A1 Mar. 28, 2013

(51) Int. Cl.

| | |
|---|---|
| H02K 5/18 | (2006.01) |
| H02K 11/04 | (2006.01) |
| H02K 19/36 | (2006.01) |
| H02K 15/00 | (2006.01) |
| H02K 19/24 | (2006.01) |
| H02K 1/18 | (2006.01) |
| H02K 3/46 | (2006.01) |

(52) U.S. Cl.
CPC .............. H02K 11/046 (2013.01); H02K 1/187 (2013.01); H02K 3/46 (2013.01); H02K 19/365 (2013.01); H02K 15/0006 (2013.01); H02K 19/24 (2013.01)
USPC .............................. 310/68 D; 310/64; 310/89

(58) Field of Classification Search
USPC ....... 310/64, 68 D, 89, 68 B, 68 C, 68 E, 263
See application file for complete search history.

(56) References Cited

U.S. PATENT DOCUMENTS

| | | | | |
|---|---|---|---|---|
| 3,599,024 A | * | 8/1971 | Kitamura | 310/163 |
| 4,032,807 A | * | 6/1977 | Richter | 310/178 |
| 4,780,637 A | * | 10/1988 | Wolcott | 310/263 |
| 5,895,994 A | * | 4/1999 | Molnar et al. | 310/215 |
| 5,977,669 A | * | 11/1999 | Yoshida et al. | 310/68 D |
| 6,541,890 B2 | * | 4/2003 | Murata et al. | 310/263 |
| 6,724,108 B2 | * | 4/2004 | Nakano | 310/68 D |
| 6,794,790 B2 | * | 9/2004 | Kusase et al. | 310/263 |
| 6,909,210 B1 | * | 6/2005 | Bostwick | 310/52 |
| 7,891,265 B2 | * | 2/2011 | Erikson et al. | 74/441 |
| 8,253,287 B2 | * | 8/2012 | Isoda et al. | 310/68 D |
| 8,299,667 B2 | * | 10/2012 | Isoda et al. | 310/68 D |
| 2004/0217663 A1 | * | 11/2004 | Kumagai | 310/71 |
| 2006/0208584 A1 | * | 9/2006 | Kirkman et al. | 310/71 |
| 2006/0232151 A1 | * | 10/2006 | DuBois | 310/68 D |
| 2007/0290557 A1 | * | 12/2007 | Ito | 310/58 |
| 2008/0012448 A1 | | 1/2008 | Hayashi | |
| 2008/0048534 A1 | * | 2/2008 | Tanaka | 310/68 D |
| 2008/0061659 A1 | * | 3/2008 | Nakamura et al. | 310/68 D |
| 2008/0231131 A1 | * | 9/2008 | Gabrys et al. | 310/114 |
| 2008/0290744 A1 | * | 11/2008 | Oohashi | 310/43 |
| 2009/0026856 A1 | | 1/2009 | Hamada | |
| 2010/0117466 A1 | * | 5/2010 | Gas et al. | 310/62 |
| 2010/0308700 A1 | * | 12/2010 | Isoda et al. | 310/68 D |

OTHER PUBLICATIONS

European Search Report for EP Application No. 12179261.8-1809, dated Aug. 23, 2013, pp. 1-9.

* cited by examiner

*Primary Examiner* — Quyen Leung
*Assistant Examiner* — Naishadh Desai
(74) *Attorney, Agent, or Firm* — Cantor Colburn LLP

(57) ABSTRACT

An alternator includes a housing having an inner surface and an outer surface, a stationary field coil component fixedly mounted to the inner surface of the housing through one or more mechanical fasteners, and a heat sink component mounted to the outer surface of the housing. The heat sink component includes one or more openings that align with corresponding ones of the one or more mechanical fasteners.

13 Claims, 3 Drawing Sheets

ALTERNATOR HAVING A HEAT SINK AND METHOD

BACKGROUND OF THE INVENTION

Exemplary embodiments pertain to the art of electric machines and, more particularly to an alternator having a heat sink.

Most motor vehicles include an alternator that transforms mechanical energy into electrical energy that is used to charge an on-board battery. Generally, alternators fall into two categories: brushed alternators, and brushless alternators. Brushed alternators include a rotor having rotor windings that is rotated within a stator. The rotor includes a pair of slip rings that are electrically coupled to the rotor windings, that when energized create rotating magnetic fields. The slip rings are in sliding contact with stationary brushes. With this arrangement, rotation of the rotor relative to the stator passes magnetic fields through the stator winding creating a current in the stator. The current is conditioned and employed to charge a battery or support vehicle electrical loads.

Brushless alternators work in the same way as brush type alternators except that there are no brushes to carry current. Brushless alternators include a main alternator and an exciter having a stationary field winding. In the exciter, the field winding creates magnetic fields in the rotor as the rotor rotates in close proximity to a large core mounted on the rotor shaft. The main alternator includes a rotor and a stationary armature or stator. Varying current through the exciter field coil varies output from the stator. The output is rectified by a stationary rectifier assembly mounted to the machine thereby creating a DC current. A portion of the DC current is passed back to the field winding to establish an alternator output. The alternator output is then employed to charge a vehicle battery or support vehicle electrical loads. Regardless of which system is employed, vehicle alternators include heat sinks that are arranged to remove heat by conduction or convection from various alternator electronic components.

BRIEF DESCRIPTION OF THE INVENTION

Disclosed is an alternator including a housing having an inner surface and an outer surface, a stationary field coil component fixedly mounted to the inner surface of the housing through one or more mechanical fasteners, and a heat sink component mounted to the outer surface of the housing. The heat sink component includes one or more openings that register with corresponding ones of the one or more mechanical fasteners.

Also disclosed is an electric machine including a housing having an inner surface and an outer surface, a stationary component mounted to the inner surface of the housing through one or more mechanical fasteners, and a component mounted to the outer surface of the housing. The component includes one or more openings that register with corresponding ones of the one or more mechanical fasteners.

Further disclosed is a method of servicing an alternator. The method includes opening a housing of the alternator to expose a stationary component, accessing one or more mechanical fasteners retaining the stationary component to an inner surface of the housing through one or more openings formed in a heat sink mounted to an outer surface of the housing, disconnecting the mechanical fasteners from the stationary component, and removing the stationary component from the housing.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
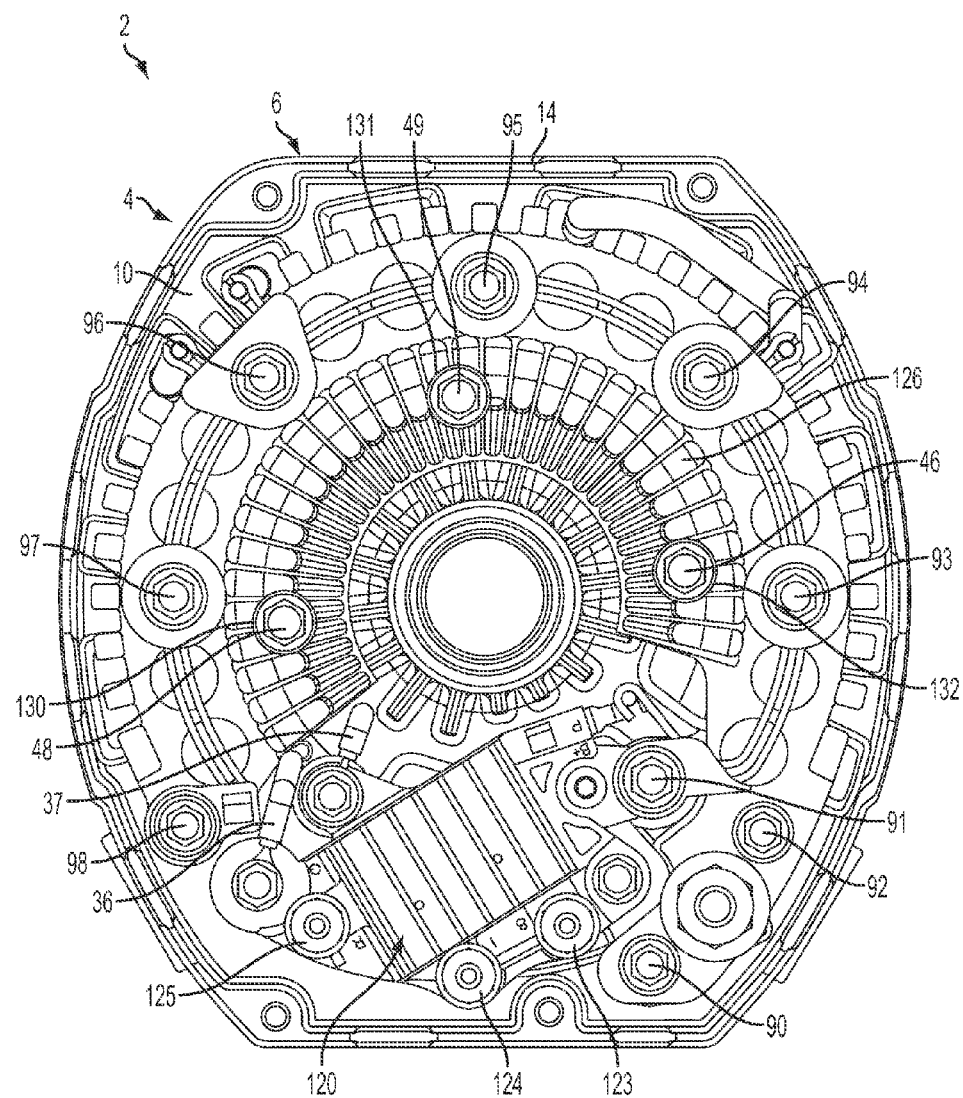
FIG. 1 depicts a plan view of an electric machine, shown in the form of an alternator, including a heat sink component in accordance with an exemplary embodiment.
Figure 2:
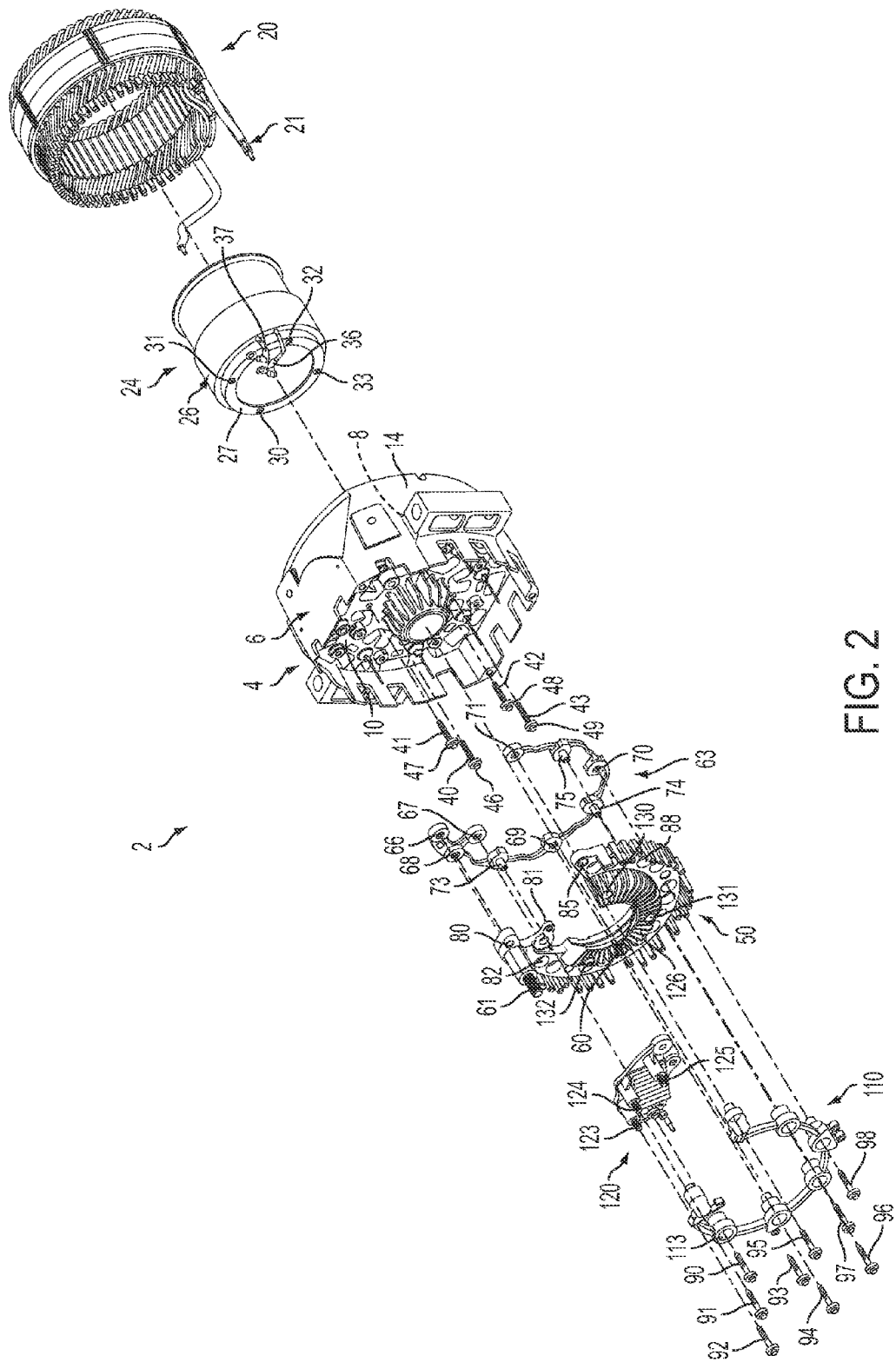
FIG. 2 depicts an exploded view of the alternator of FIG. 1.

An electric machine, in accordance with an exemplary embodiment, is indicated generally at 2 in FIGS. 1-2. Electric machine 2 takes the form of an alternator 4. Alternator 4 is generally configured for automotive or industrial use and includes a housing member 6 having an inner surface 8, an outer surface 10, and a peripheral wall 14. Alternator 4 includes a stator 20 fixedly mounted relative to housing member 6. Stator 20 includes a number of stator leads 21 which, as will be discussed more fully below, deliver electric current to charge, for example, a vehicle battery. Alternator 4 takes the form of a brushless alternator and thus also includes a stationary field coil component 24. At this point it should be understood that alternator 4 also includes one or more rotating components (not shown) that are rotatably supported between housing member 6 and another housing component (also not shown).

Stationary field coil component 24 includes a field coil body 26 having a mounting surface 27. Mounting surface 27 includes a number of mounting openings 30, 31, 32, and 33. Field coil body 26 is also shown to include a pair of field coil leads 36 and 37. With this arrangement, stationary field coil component 24 is configured to be supported at inner surface 8. That is, a plurality of mechanical fasteners 40, 41, 42, and 43 extend through openings (not separately labeled) formed in housing member 6 and engage with corresponding ones of mounting members 30-33. As will be discussed more fully below, each mechanical fastener 40-43 includes a corresponding head portion 46-49 that is configured to receive a tool (not shown).

Figure 3:
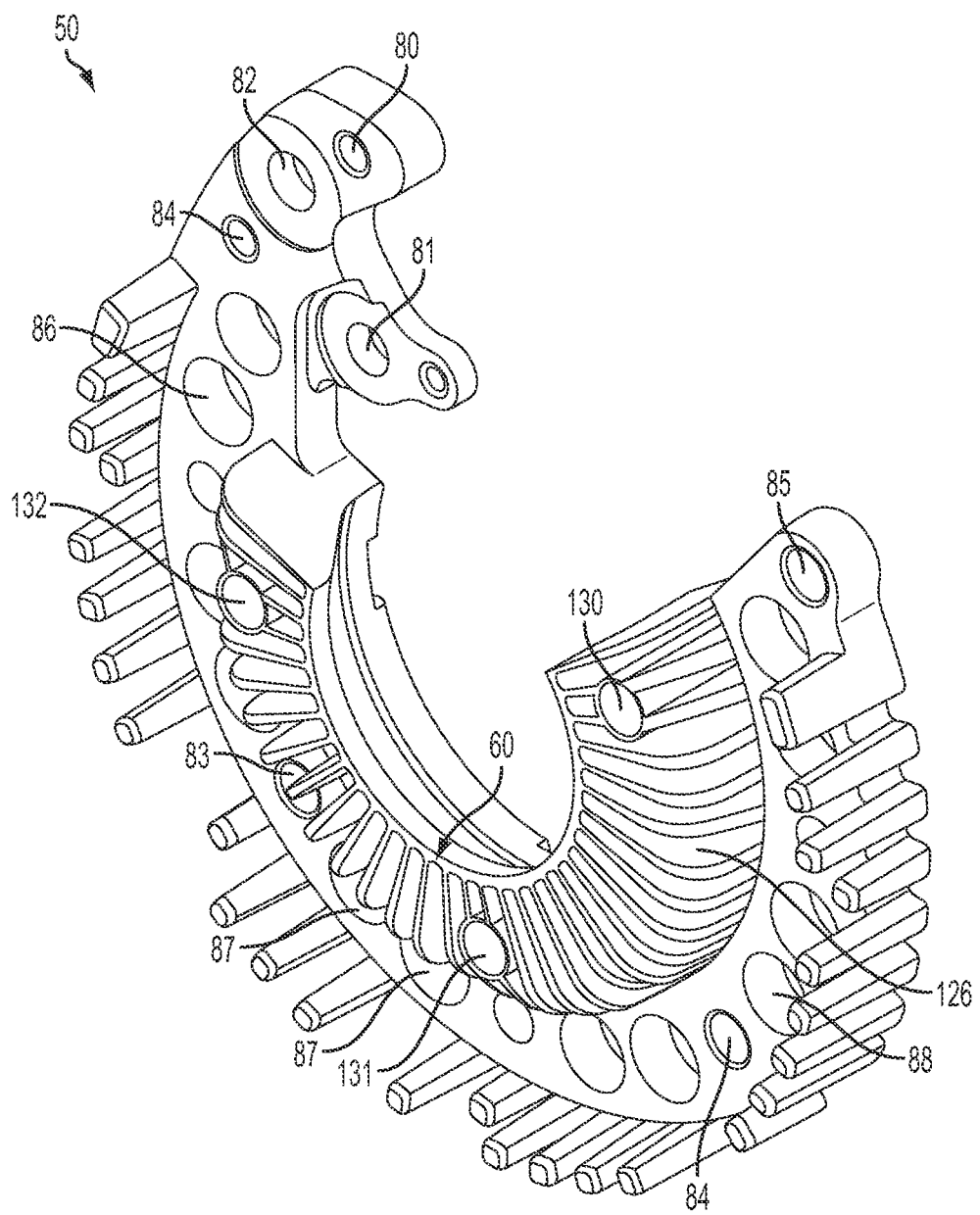
FIG. 3 depicts a perspective view of the heat sink component in accordance with an exemplary embodiment.

In accordance with the exemplary embodiment, alternator 4 includes a positive rectifier assembly 50 having a heat sink component 60, a plurality of diodes (not separately labeled) and an electrical terminal 61 mounted to outer surface 10 of housing member 6 through an insulator member 63. Electrical terminal 61 provides a connection to, for example, a battery. Insulator member 63 reduces heat transfer from housing 6 to heat sink 60. Insulator member 63 includes a plurality of openings 66, 67, 68, 69, 70, and 71 as well as a number of locating elements 73, 74, and 75 that corresponds to a plurality of openings, 80, 81, 82, 83, 84, and 85 and a number of locating members 86, 87, and 88 formed on heat sink component 60 such as shown in FIG. 3. Openings 66-71 on insulator member 63 register with openings 80-85 on heat sink component 60. Similarly, locating elements 73-75 on insulator member 63 register with locating members 86-88 on heat sink member 60. With this arrangement heat sink member 60 is secured to outer surface 10 by a plurality of mechanical fasteners 90-98.

Heat sink component 60 supports and generally thermally isolates a terminal lead frame 110 from housing member 6. Terminal lead frame 110 electrically isolates heat sink component 60 from electric machine 2 and provides connections (not shown) between stator 20 and the plurality of diodes. Terminal lead frame 110 includes a number of isolator members, one of which is shown at 113. Isolator members are received by openings (not separately labeled) formed in positive rectifier assembly 50 to electrically isolate mechanical fasteners 90-98 from positive rectifier assembly 50. Heat sink component 60 is also shown to support a regulator assembly 120 having a number of terminals 123-125. Terminals 123-125 provide customer specific electrical connections for electric machine 2. With this arrangement, mechanical rotational energy input to alternator 4 creates electrical energy that is output through electrical terminal 61 to charge a motor vehicle battery. Of course, alternator 4 could be employed in a wide range of energy conversion applications.

Heat sink component 60 is also shown to include a number of fins 126 that are configured to provide additional surface area to increase heat dissipation. Heat sink component 60 is further shown to include a number of openings 130-132 that are formed in fins 126. Openings 130-132 are configured to align with head portions 46, 48, and 49 of fasteners 40, 42, and 43 when heat sink component 60 is mounted to outer surface 10. With this arrangement, regulator assembly 120 is removed to expose fastener 41. Fastener 41 may then be removed and a tool, such as a socket wrench, may be inserted through each of openings 130-132 and engage with head portions 46, 48, and 49 to loosen and remove fasteners 40, 42, and 43 allowing the removal of stationary field coil component 24 without disturbing connections to terminal frame 110, or regulator assembly 120.

At this point it should be understood that the exemplary embodiment provides a heat sink component that facilitates the removal and replacement of a stationary field coil component without disturbing electrical connections to other components such as diodes mounted to positive rectifier assembly 50. In this manner, the alternator can be serviced and put back into use without risking damage to diodes or other sensitive electronic components. It should also be understood that while shown formed in the fins, the openings can be provided in whatever location is necessary to align with fasteners that are used to retain the stationary field coil component. Also, while shown in connection with an alternator, the heat sink component in accordance with the exemplary embodiment can be employed in a wide array of electric machines.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An alternator comprising:
   a housing having an inner surface and an outer surface;
   a stationary field coil component fixedly mounted to the inner surface of the housing through a plurality of mechanical fasteners; and
   a heat sink component mounted to the outer surface of the housing, the heat sink component including a plurality of openings that align with, and provide exclusive access to, corresponding ones of the plurality of mechanical fasteners of the stationary field coil component.

2. The alternator according to claim 1, further comprising: an insulator member arranged between the heat sink component and the outer surface of the housing.

3. The alternator according to claim 1, wherein the heat sink component includes a plurality of fins, the plurality of openings being formed in the fins.

4. A method of servicing an alternator comprising:
   opening a housing of the alternator to expose a stationary component;
   accessing a plurality of mechanical fasteners retaining the stationary field coil component to an inner surface of the housing through corresponding ones of a plurality of openings formed in a heat sink component mounted to an outer surface of the housing, the one or more openings providing exclusive access to the one or more mechanical fasteners of the stationary field coil component;
   disconnecting the mechanical fasteners from the stationary field coil component; and
   removing the stationary component from the housing.

5. The method of claim 4, further comprising: electrically disconnecting the stationary field coil component from one or more terminals provided on a regulator.

6. The method of claim 4, wherein accessing the plurality of mechanical fasteners through the corresponding ones of the plurality of openings formed in the heat sink component includes accessing the plurality of mechanical fasteners without disturbing connections to one or more components mounted to the heat sink component.

7. The method of claim 6, wherein accessing the plurality of mechanical fasteners through the corresponding ones of the plurality of openings formed in the heat sink component includes accessing the one or more mechanical fasteners without disturbing electrical connections to one or more electrical components mounted to the heat sink component.

8. The method of claim 4, wherein removing the stationary field coil component from the housing includes removing a stationary field coil mounted to an inner surface of the housing.

9. The method of claim 4, further comprising: installing another stationary field coil component into the housing.

10. The method of claim 9, wherein installing another stationary field coil component in the housing includes passing one or more mechanical fasteners through corresponding ones of the plurality of openings formed in the heat sink component.

11. The method of claim 9, further comprising: electrically connecting the another stationary field coil component to the one or more terminals provided on the regulator.

12. The method of claim 10, further comprising: connecting a tool to each of the plurality of mechanical fasteners through the corresponding ones of the plurality of openings formed in the heat sink component.

13. The method of claim 10, wherein connecting a tool to each of the plurality of mechanical fasteners includes securing a socket wrench to a head portion of each of the plurality of mechanical fasteners.

* * * * *